United States Patent
Kerns

(10) Patent No.: US 10,181,131 B2
(45) Date of Patent: Jan. 15, 2019

(54) CONDITIONAL BILLING OF ADVERTISEMENTS BASED ON DETERMINED USER INTEREST

(75) Inventor: Jamieson Kerns, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 1654 days.

(21) Appl. No.: 13/431,924

(22) Filed: Mar. 27, 2012

(65) Prior Publication Data

US 2018/0218394 A1    Aug. 2, 2018

(51) Int. Cl.
  *G06Q 30/02*  (2012.01)
(52) U.S. Cl.
  CPC ................. *G06Q 30/0251* (2013.01)
(58) Field of Classification Search
  CPC ..................................................... G06Q 30/02
  USPC ............................................................ 705/14
  See application file for complete search history.

(56) References Cited

U.S. PATENT DOCUMENTS

| | | | |
|---|---|---|---|
| 2008/0066107 A1* | 3/2008 | Moonka | G06F 17/30796 725/42 |
| 2008/0147488 A1* | 6/2008 | Tunick | G06Q 30/02 705/7.29 |
| 2009/0006375 A1* | 1/2009 | Lax | H04N 21/435 |
| 2009/0182886 A1* | 7/2009 | McCartie | H04H 20/16 709/230 |
| 2010/0010890 A1* | 1/2010 | Ditkovski | G06Q 30/0242 705/14.41 |
| 2011/0171980 A1* | 7/2011 | SJoberg | G06F 17/30867 455/466 |

OTHER PUBLICATIONS iab. In-Game Advertising Measurement Guidelines (Sep. 2009) IAB In-Game Ad Measurement Working Group with guidance from the IAB Games Committee (Year: 2009).*

* cited by examiner

*Primary Examiner* — Patricia H Munson
(74) *Attorney, Agent, or Firm* — Foley and Lardner LLP

(57) ABSTRACT

Systems and methods for determining a billing level for an advertisement provided to a user based on monitored user interaction with the advertisement are provided. A streaming component streams a media advertisement to a device in a format that allows user interaction with the media advertisement. A monitoring component monitors duration of user interaction with the advertisement, and an analysis component determines level of billing associated with the advertisement based at least in part on the monitored duration of user interaction with the advertisement. In an aspect, the analysis component determines a cumulative playing period of the advertisement based on the monitored user interaction and determines the level of billing based in part on the cumulative playing period.

19 Claims, 10 Drawing Sheets

CONDITIONAL BILLING OF ADVERTISEMENTS BASED ON DETERMINED USER INTEREST

TECHNICAL FIELD

This disclosure relates to providing media advertisements and billing for the providing of the advertisements based in part on user interaction with the advertisements.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

Often times, although a user may receive a media advertisement (e.g., a video advertisement streamed to a client device), the user may not listen to it or view it. Nevertheless, a sponsor or owner of the advertisement may still have paid or be obligated to pay a streaming media provider for advertising space associated with the streamed video advertisement.

Further, where an in-stream advertisement is provided with an option to skip an advertisement, a viewer may directly declare disinterest by selecting to skip the advertisement. However, users presented with a video advertisement that they can skip often need more context around what the video advertisement is about in order to decide whether it's applicable and interesting to them prior to skipping. They also may be interested in watching a long video that was presented as a skippable advertisement but which they did not skip.

In accordance with one or more embodiments and corresponding disclosure, various non-limiting aspects are described in connection with providing media advertisements and billing for the providing of the advertisements based in part on user interaction with the advertisements.

In accordance with a non-limiting embodiment, in an aspect, a system is provided comprising a streaming component that streams a media advertisement to a device in a format that allows user interaction with the media advertisement. The system comprises a monitoring component that monitors duration of user interaction with the advertisement, and an analysis component that determines level of billing associated with the advertisement based at least in part on the monitored duration of user interaction with the advertisement. In an aspect, the analysis component determines a cumulative playing period of the advertisement based on the monitored user interaction and determines the level of billing based in part on the cumulative playing period.

In another non-limiting embodiment, provided is a method comprising streaming a media advertisement to a device in a format that allows user interaction with the media advertisement. The method further includes monitoring a duration of user interaction with the advertisement, and determining a level of billing associated with the advertisement based in part on the monitored duration of user interaction with the advertisement. In an aspect, the method can include determining a cumulative playing period of the advertisement based on the monitored duration of user interaction, and determining the level of billing based in part on the cumulative playing period of the advertisement.

In yet another non-limiting embodiment a computer-readable storage medium is provided comprising computer-readable instructions that, in response to execution, cause a computing system to perform operations, comprising streaming a media advertisement to a device in a format that allows user interaction with the media advertisement. The operations further comprise monitoring duration of user interaction with the advertisement, and determining a level of billing associated with the advertisement based in part on the monitored duration of user interaction with the advertisement. In an aspect, the operations can include determining a cumulative playing period of the advertisement based on the monitored duration of user interaction, and determining the level of billing based in part on the cumulative playing period of the advertisement.

DETAILED DESCRIPTION

Figure 1:
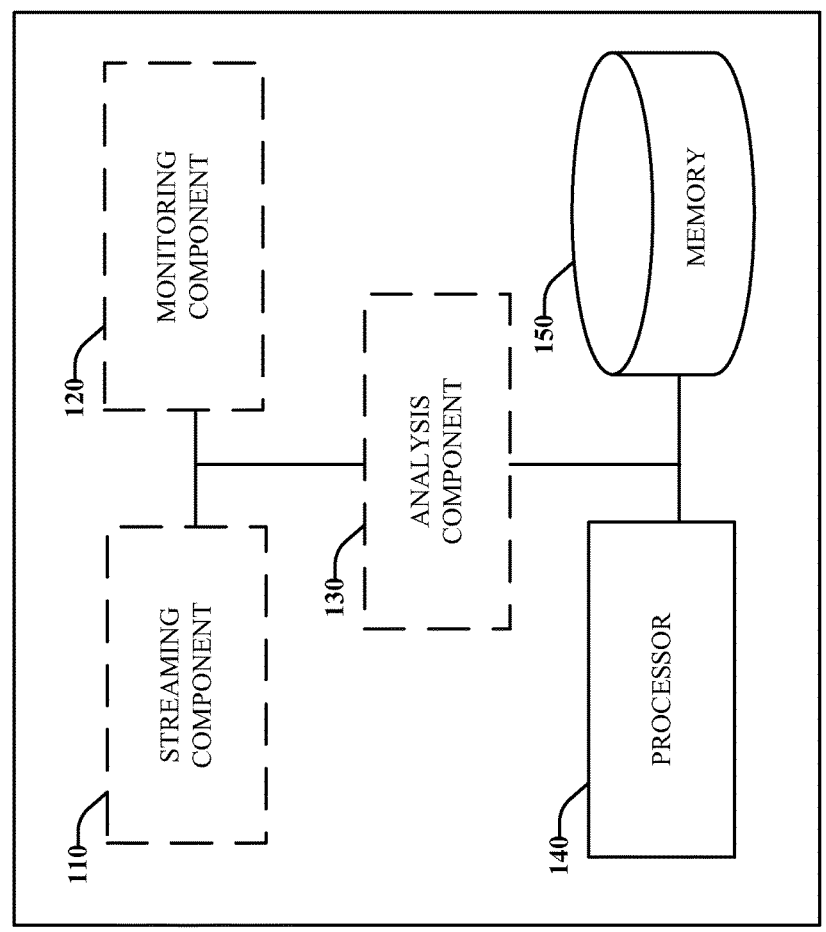
FIG. 1 illustrates an example non-limiting locating system that facilitates providing media advertisements and billing for the providing of the advertisements based on user interaction with the advertisements in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more embodiments or implementations described in this disclosure, users can opt-out of providing personal information, demographic information, location information, proprietary information, sensitive information, or the like in connection with data gathering aspects. Moreover, one or more embodiments or implementations described herein can provide for anonymizing collected, received, or transmitted data.

Systems and methods are described for determining a billing level for an advertisement provided to a user based on monitored user interaction with the advertisement are provided. A streaming component streams a media advertisement to a device in a format that allows user interaction with the media advertisement. A monitoring component monitors duration of user interaction with the advertisement, and an analysis component determines level of billing associated with the advertisement based at least in part on the monitored duration of user interaction with the advertisement. In an aspect, the analysis component determines a cumulative playing period of the advertisement based on the monitored user interaction and determines the level of billing based in part on the cumulative playing period.

Referring now to the drawings, with reference initially to FIG. 1, a media system 100 that facilitates providing media advertisements and billing for the providing of the advertisements based on user interaction with the advertisements. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 150 for storing computer executable components and instructions. A processor 140 can facilitate operation of the computer executable components and instructions by the system 100.

In an embodiment, system 100 can include streaming component 110, monitoring component 120, and analysis component 130. Streaming component 110 is configured to stream media items to a client device. In an aspect, streaming component 110 streams a media advertisement to a device in a format that allows user interaction with the media advertisement. User interaction with a media item. such as a media advertisement, can include any form of involvement with the media item, including but not limited to viewing or playing the media item, replaying the media item, fast-forwarding the media item, re-winding the media item, pausing the media item, stopping the playing of the media item, and etc. Monitoring component 120 monitors user interaction with the advertisement and analysis component 130 determines a level of billing associated with the advertisement based at least in part on the monitored user interaction with the advertisement. In an aspect, users can opt-out of providing personal information in connection with monitoring aspects. Further, users can opt-out of one or more aspects of monitoring user interaction with advertisements.

As used herein, the term media item can include video data and/or audio data, associated with one or more data sources that can be accessed by a client device or by a media system such as system 100 (and additional systems described in this disclosure). For example, media items can include various types of video including but not limited to movies, television, streaming television, advertisements or video games. In an aspect, a data source can include a data store storing media items and located internal to system 100. For example, memory 150 can include a data store storing video files. In another aspect, a data source can include a data store storing media items and affiliated with a content provider that interacts with the media system 100.

In an aspect, media system 100, (and additional systems described in this disclosure), provide media items, such as videos, to a client device (not shown). A client device can include any suitable computing device associated with a user and configured to interact with or receive media content. For example, a client device can include a desktop computer, a laptop computer, a smart-phone, a tablet personal computer (PC), or a PDA. As used in this disclosure, the terms "consumer" or "user" refer to a person, entity, system, or combination thereof that employs media system 100 (or additional systems described in this disclosure) via a client device. In an aspect, a client device or media system 100 (or additional systems described in this disclosure) can be configured to access and receive media items via a network such as for example the Internet, intranet, or cellular service. For example, a client device may view and interact with media items provided by system 100 (or additional systems described herein) using a browser.

In an embodiment, streaming component 110 streams media items to client devices over a network using a streaming media system. For example, the streaming component 110 can employ an HTTP-based media streaming communications protocol that works by breaking the overall stream into a sequence of small HTTP-based file downloads, each download loading one short chunk of an overall potentially unbounded transport stream. For example, the streaming component 110 can employ HTTP Live Streaming (HLS). In another example the streaming component 110 can employ smooth streaming or HTTP dynamic streaming.

Streaming component 110 is configured to stream multiple videos to a same device concurrently. In particular, streaming component 110 can stream a video to a client device and further provide the client with an in-stream advertisement. As used herein, the term in-stream is used to refer to a video streamed on a same or different media stream as another video that is provided to a client device at a same or substantially same time as the other video. In-stream advertisements provide a platform that allows advertisers to place video ads in video content that is streamed over a network. Streaming component 110 is configured to stream video with in-stream video advertisements. In an aspect, an in-stream video can include a pre-roll video, a companion banner, and/or a non-linear banner. A pre-roll video is a digital video (often a 15 to 30 second advertisement) that plays in a web site's video player before or in the middle of other video content. A companion banner can be a player banner that displays on a webpage while the pre-roll video is playing and remains on the page after the video has completed. A Non-linear banner is an interactive banner or static image that displays over a pre-roll video as it's playing. Non-linear banners may also disappear after the pre-roll video completes or continue through the entire content play of the other video content.

Streaming component 110 is configured to stream an in-stream advertisement to a device in a format that allows a user of the device to interact with the actual advertisement. For example, streaming component 110 can stream an advertisement to a client device that is configured to be played as a pre-roll video in conjunction with a requested video. The advertisement can further be provided with an option to skip the advertisement upon user selection of an interactive dialogue box that initiates the skipping or ending of the advertisement. For example, an in-stream advertisement that is thirty seconds long may be configured to enable a user to select an option to skip the advertisement after viewing the first five seconds of the advertisement. However, in addition to being configured to be played and skipped, streaming component 110 can stream an advertisement that can further be configured to be re-played, paused, fast-forwarded, re-winded, and/or shared.

For example, the streaming component 110 may stream an advertisement to a device employing a media player that enables playing and interaction with the advertisement. The advertisement can further be streamed by streaming component 110 in a format that allows the advertisement to be played in real-time or substantially real-time, paused, re-played, fast-forwarded, re-winded, and shared. Upon receiving the advertisement at the device, a user of the device may employ the media player to play the first ten seconds of the advertisement, then rewind and replay the first ten seconds, then jump ahead or fast-forward the advertisement and play the last ten seconds, then rewind the advertisement back to the beginning and pause the advertisement prior to re-playing, and etc. The user may desire to interact with the advertisement in any manner in order to gain an understanding of the subject matter of the advertisement prior to watching the entire advertisement or re-watch parts of the advertisement for educational or entertainment value. Regardless of the reasons for interacting with the advertisement, the streaming component 110 is configured to stream advertisements in a format that allows for such interaction.

Monitoring component 120 monitors a variety of factors that can be employed by analysis component 130 to determine an appropriate billing level for an advertisement provided to a client device. In general, advertisements are effective if received and at least viewed and/or heard by a potential consumer or targeted individual. Often times, although a user may receive a media advertisement, the user may not listen to it or view it. Further, where an in-stream advertisement is provided with the option to skip the advertisement, a viewer may directly pronounce his disinterest by selecting to skip the advertisement. It can be assumed that owners of advertisements will be more inclined to pay for advertising space with streaming media providers if the owner of the advertisement can at least in part ensure that their advertisement is actually viewed and/or heard by a user. Accordingly, owners of advertisements may pay a premium for an advertisement provided to a user that not only viewed and/or listened to the advertisement, but further engaged with and interacted with the advertisement in a manner that indicated the user was clearly interested in the advertisement.

With the above, in an embodiment, the monitoring component 120 is configured to monitor at least user interaction with an advertisement and additional factors associated with user engagement with an advertisement. User interaction with an advertisement can include but is not limited to, viewing or playing the advertisement, re-playing the advertisement, pausing the advertisement, fast forwarding the advertisement or re-winding the advertisement. Further to monitoring mere user interaction with an advertisement, the monitoring component can monitor the type of interaction, the frequency of interaction, and results associated with the interaction. Additional factors associated with user engagement with an advertisement include secondary factors related to the user's interaction with the device at which an advertisement is streamed in conjunction with the playing of the advertisement. For example, secondary factors can include but are not limited to: device context, a user's physical positioning and/or posture, a user's visual direction, device operating parameters, volume of the player in which an advertisement is being played, the size of the window of the player in which the advertisement is being played in the graphical user interface (GUI) of the device, the number of open windows in the GUI of the device, or the location of the player application window with respect to other open windows in the GUI of the device. In an aspect, users can opt-out of one or more aspects of monitoring user interaction with advertisements and monitoring of secondary factors related to the user's interaction with the device at which an advertisement is streamed in conjunction with the playing of the advertisement.

With respect to user interaction with an advertisement, in an aspect, the monitoring component 110 can monitor the duration of user interaction with the advertisement. Duration of user interaction with advertisement can include the cumulative time period in which a user interacts with advertisement. For example, the monitoring component can monitor the playing time of a video, the re-winding time, the fast-forwarding time, and/or or the time paused. According to this example, the duration of interaction with the advertisement would include the total time spent playing the video, re-winding the video, the fast-forwarding the video and pausing the video. In a similar aspect, the monitoring component can monitor playing time of an advertisement so that the analysis component may determine a cumulative playing period of the advertisement. For example, monitoring component 110 can monitor a duration of time at least portions of the advertisement are played, wherein portions of the advertisement can be played in a nonconsecutive order. According to this example, a user may play a first portion of an advertisement, skip ahead to another portion, then go back and replay the first portion. Thus the monitoring component 110 can also monitor a duration of time at least portions of the advertisement are played, including a duration of time associated with replaying portions of the advertisement.

In another aspect, the monitoring component 110 can monitor qualitative factors associated with user interaction with an advertisement. For example, the monitoring component 110 can monitor the type of user interaction advertisement, the timing of user interaction with an advertisement and frequency of user interaction with an advertisement. For example, the monitoring component 110 can monitor the duration of time a video is played, when a video is re-winded and to what point, when a video is fast forwarded and to what point, what sections of the video are played and what sections are replayed, or what sections are paused and when they are paused, and etc. Further, the monitoring component 110 can monitor the frequency of user interaction with an advertisement. For example, the monitory the number of times a user presses pause or rewind over the duration of interaction with the advertisement.

With respect to secondary factors related to a user's interaction with the device at which an advertisement is streamed in conjunction with the playing of the advertisement, in an aspect, the monitoring component can monitor device context. Device context can include but is not limited physical location of a device, other devices near a device at which an advertisement is being played, and time of day. Other secondary factors can relate to a user's physical presence with respect to a device at which an advertisement is being streamed. For example, the monitoring component can monitor location of a user with respect the device, location of a user's hand with respect to an interfacing tool such as a mouse or keyboard, a user's posture, and/or the direction of a user vision. According to this aspect, the monitoring component 130 can utilize one or more sensory device associated with a user device to determine a user's physical presence. For example, the monitoring component 130 can utilize a camera, an acoustic sensor, an optical sensor, or a thermal sensor associated with a client device.

In another aspect, the monitoring component can monitor secondary factors relating to device operating parameters, including but not limited to screen size, picture quality, and network connection efficiency. In another aspect, the monitoring component 130 can monitor volume of the player in which an advertisement is being played, including when the volume of the player is turned off or muted. Still in other aspects, the monitoring component 130 can monitor size of a window of the player in which the advertisement is being played in the graphical user interface (GUI) of the device. For example, the monitoring component 130 can monitor if a window is minimized or maximized, as well as sizing dimensions of the window. Similarly, the monitoring component 130 can monitor number of open windows in the GUI of the device, or location of the player application window with respect to other open windows in the GUI of the device. For example, the monitoring component can monitor whether the player application window in which an advertisement is being played is obscured by another open window and to what degree.

Analysis component 130 analyzes information monitored by monitoring component to determine an appropriate billing level for an instance of providing an advertisement to a client device. In an aspect, the analysis component can determine a billing level for an instance of providing an advertisement by system 100 (and additional systems described herein) based in part on user interaction with the advertisement, including the quantity or duration of user interaction and the quality of user interaction. In addition, the analysis component 130 can determine a billing level for an instance of providing an advertisement by system 100 based in part on inferred or determined user engagement with the advertisement.

In an aspect, a billing level can be associated with a predefined monetary amount that is based in part on user interaction and/or user engagement with an advertisement. According to this aspect, billing levels can include any suitable number of levels N (N being an integer) where each level is associated with a different pre-defined monetary amount. For example, system 100 (and additional systems disclosed herein) can account for two basic billing levels, the first being non-billable or "free" and associated with a first dollar amount of for instance zero dollars. The second billing level can be associated with a set charge of X dollars (X being an integer). Based on monitored information, an advertisement, when provided to a client device, will result in either the first billing level or the second billing level to be applied by the analysis component 130. For instance, if a user views an advertisement for 5 seconds or less, then the analysis component 130 may apply the first billing level (resulting in no charge for providing the advertisement), and if the user views the advertisement for 6 seconds or more, the analysis component 130 may apply the second billing level (resulting in a standard rate charge for providing the advertisement). In another example, system 100 can account for a plurality of different billing levels (greater than two), where each billing level is associated with a pre-defined monetary amount and a degree of user interaction activity. In yet another aspect, the analysis component 130 can determine a tailored billing level (e. g. an itemized bill) for each instance an advertisement is provided to a client device based on quantity and quality of user interaction with the advertisement. According to this aspect, a billing level is not predefined by system 100, but dynamically determined by the analysis component 130 based on monitored information.

In an aspect, the analysis component 130 can apply predetermined threshold parameters stored in memory 150 relating user interaction activity with advertisements and billing levels. For example, the analysis component 130 can employ one or more algorithms that relate monitored user interaction activity information with advertisements and billing levels. The parameters may relate to a variety of factors, including quantitative factors and qualitative factors of the monitored information. Quantitative factors can relate to cumulative durations of user interaction with an advertisement, such as percentage of the advertisement watched. For example, a cumulative playing time of five seconds can be associated with a first billing level, a cumulative playing time of 10 seconds can be associated with a second billing level, a cumulative playing time of 30 seconds can be associated with a third billing level, and etc. The analysis component 130 can determine cumulative playing time by accounting for total time spent viewing or playing an advertisement, regardless of sections of the advertisement that were played and the manner in which they were played. For example, a cumulative playing time of 15 seconds can occur when an advertisement is played from second 1 through second 15, or when the advertisement is played from seconds 1-5 and seconds 20-30. In addition, the parameters may account for qualitative factors, such as for example, the type of interaction, the frequency of interaction, a timing of interaction. For example, the viewing of key or specific sections of an advertisement may relate to a higher engagement level and thus a higher billing level.

In an aspect, the analysis component 130 can apply a point based system to determine a billing level associated with user interaction with an advertisement. According to this aspect, quantitative and qualitative measures of user interaction with an advertisement can be associated with point values and stored in memory 150. For example duration of playing time may be associated with a first point value, re-winding and or fast-forwarding of a section of the advertisement may be associated with another point value, and playing or replaying of specific sections may be associated with another point value. The analysis component 130 can determine a billing level (e.g. and itemized bill) for a provided advertisement based on the specific user interaction.

It should be appreciated that the point values associated with a particular user interaction activity can indirectly relate to user interest in the advertisement. For example, an advertisement for a pharmaceutical drug may comprise a 20 second portion of a story or dialogue intended to capture an audience's attention followed by the revelation of the name of the drug in the last 10 seconds with a phone number to call for more information about the drug. The owner of the advertisement will most likely be most concerned that a consumer view the last 10 seconds of the advertisement. Accordingly, user interaction activity associated with the last 10 seconds of the advertisement can be associated with a higher point value than activity associated with the first 20 seconds. As a result, the analysis component 130 may determine a first billing level where a user views the first 20 seconds only, a second billing level where a user view the entire 30 second advertisement, and yet a third billing level where the user views and rewinds and replays the last 10 seconds of the advertisement.

In an embodiment, the analysis component can determine levels of user interaction based on both monitored qualitative and quantitative information associated with user interaction with an advertisement. For example, the analysis component can apply weighted values to a duration of interaction, a type of interaction, a timing of interaction and a frequency of interaction. The weighted values can be associated with monitored information via one or more algorithms stored in memory 150. The analysis component can thus output a value indicative of a level of user interaction with an advertisement that accounts for the quantity and the quality of user interaction with the advertisement. Levels of interaction can further be employed by analysis component to determine billing levels. For example, a high level of interaction can related to a high billing level. Relationships between levels of user interaction and billing levels can further be associated in memory 150.

Further, in another aspect, the analysis component 130 may apply other predetermined parameters stored in memory 150 relating to secondary factors that further account for user engagement with an advertisement and billing levels. For example, secondary factors can be stored in memory 150 and associated with billing levels. For instance, a user's visual direction toward a display screen as opposed to away from the display screen can result in different billing levels. Similarly, a low or muted volume of a player as opposed to an audible volume of the player may or a minimized player window as opposed to a maximized player window, may respectively be associated with different billing levels in memory 150.

According to this aspect, the secondary factors can be associated with engagement levels which can be respectively associated with billing levels. In addition, levels of user interaction and or factors associated with the quality and/or quality of user interaction with an advertisement can further be considered by the analysis component 130 when determining engagement levels. For example, the analysis component 130 may determine that a user who has a player window playing an advertisement in a minimized format with the volume muted and who has only played an advertisement for X seconds, is a disengaged user, or a user with an engagement level of zero. As a result, the analysis component 130 may determine, via preconfigured parameters in memory 150, that an engagement level of zero equates to a billing level of zero. It should be appreciated that both user interaction activity with an advertisement as well as secondary factors associated with user interaction with the user device, can contribute to the analysis component's determination of a user's engagement or interest in an advertisement.

Figure 2:
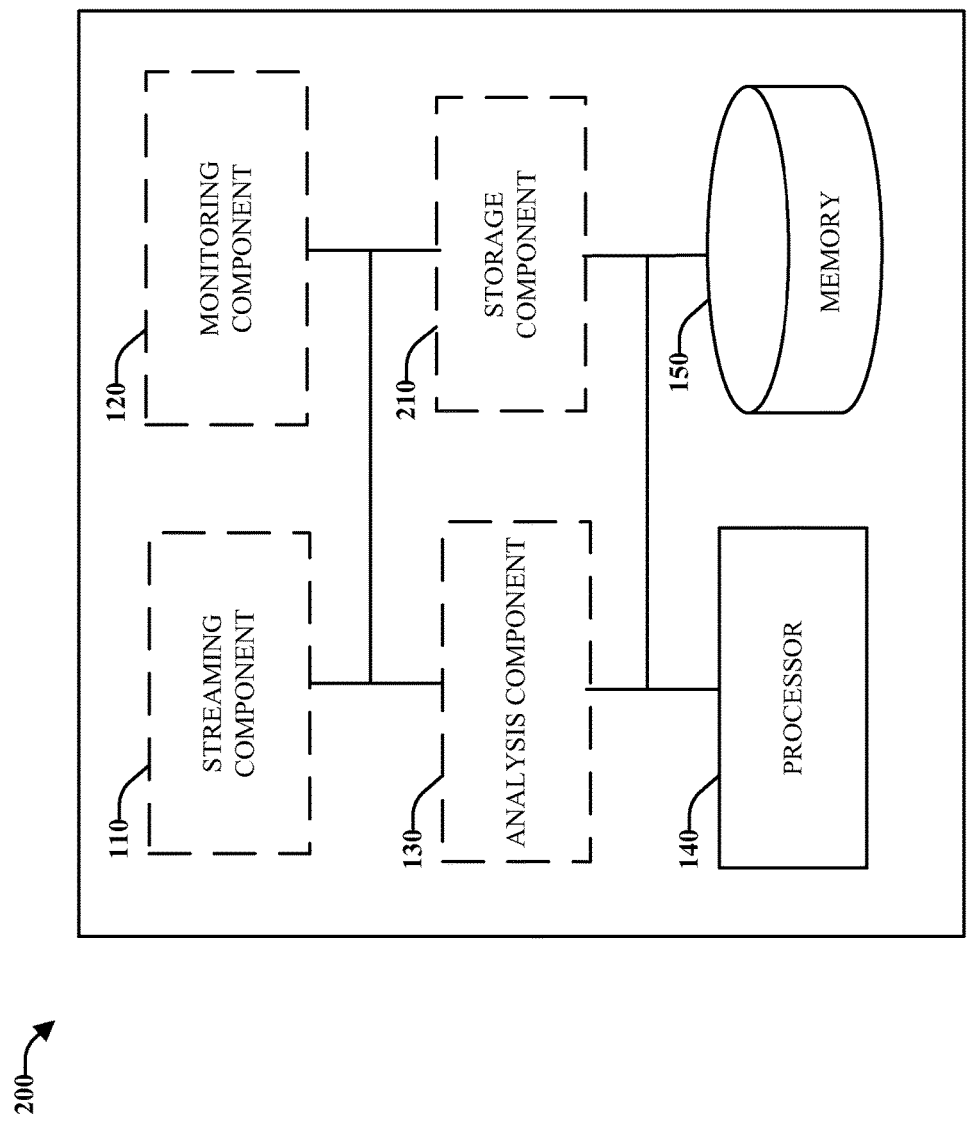
FIG. 2 illustrates an example of another non-limiting system that facilitates providing media advertisements and billing for the providing of the advertisements based on user interaction with the advertisements in accordance with various aspects and implementations described herein.

Referring now to FIG. 2, presented is another exemplary non-limiting embodiment of a media system 200 that facilitates providing media advertisements and billing for the providing of the advertisements based on user interaction with the advertisements. System 200 can include a storage component 210 that stores monitored information. In an aspect, the storage component 210 stores monitored information indicating at least user interaction with an advertisement. The storage component 210 can further store any suitable information monitored by the monitoring component, including information pertaining to user engagement in an advertisement. In addition, the storage component can store determinations and inferences made by system 100 (and additional system described herein), as well as factors which facilitate the respective determinations and inferences. Further, although storage component 210 and memory 150 are depicted as internal to system 200, in an aspect, storage component 210 and/or memory 150 can be provided external to system 200 and made accessible to system 200 via one or more network connections.

In an embodiment, the storage component 210 can store information associated with a user, such a user profile information and/or user usage history in association with media system 200. For example, user profile information can identify a user and indicate a user's media preferences, a user's demographics, a user's age, a user's profession, a user's schedule, and any other type of information which may influence a user's interest in a media advertisement in general or under a particular context. Usage history for a user with respect to media system 200 can include a track record of a user's interaction with advertisements as well as a track record of secondary factors related to user engagement with an advertisement.

Figure 3:
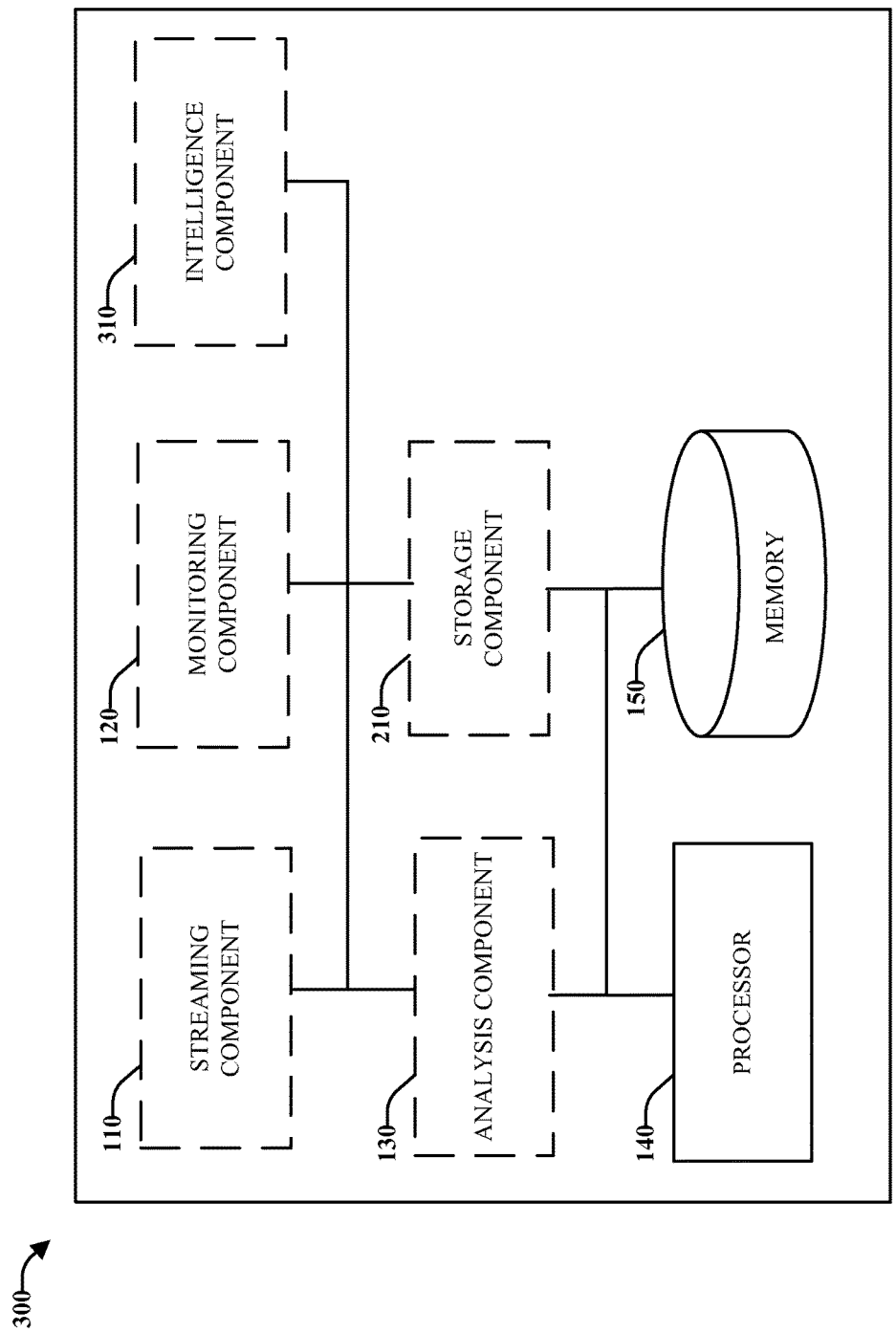
FIG. 3 illustrates an example of another non-limiting system that facilitates providing media advertisements and billing for the providing of the advertisements based on user engagement with the advertisements in accordance with various aspects and implementations described herein.

Referring now to FIG. 3, presented is another exemplary non-limiting embodiment of a media system 300 that facilitates providing media advertisements and billing for the providing of the advertisements based on user interaction with the advertisements. System 300 can include intelligence component 310. In an aspect, intelligence component 310 can aid analysis component in determining user engagement and/or interest in an advertisement. In another aspect, intelligence component 310 can facilitate inferring or determining patterns in user interaction/engagement with advertisements.

Intelligence component 310 can facilitate making inferences or determinations in connection with determining user interest/engagement with an advertisement. For example, intelligence component may employ learned associations between playing time, playing of specific sections of an advertisement, user preferences, player volume level, and player window location with respect to the GUI of a user device, in order to infer user engagement level in an advertisement. In order to provide for or aid in the numerous inferences described in this disclosure, intelligence component 310 can examine the entirety or a subset of data to which it is granted access in order to provide for reasoning about user engagement with an advertisement. Intelligence component 310 can be granted access to any information associated with media system 300 (and additional system described herein), including information logged and/or monitored by system 300 (via monitoring component 120) and stored in memory 150, as well as accessible extrinsic information. For example, intelligence component 310 can employ monitored information held in storage component 210, user preference and usage history information in held in storage component 210, and parameters related to user interaction and billing levels as well as secondary factors and user engagement, stored in memory 150. Intelligence component can further employ extrinsic information related to current events and extrinsic information describing provided advertisements.

Intelligence component 310 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

In an embodiment, analysis component 120 and/or intelligence component can employ information contained in storage component 210 to determine patterns in user interaction and/or user interest in an advertisement. For example, the analysis component 130 may determine that when particular advertisement is viewed at a 30 percent cumulative playing period, including viewing of seconds 12-20, and when viewed on a display screen with high resolution, the advertisement results in a billing level of 3. The analysis component 130 and/or intelligence component 310 can further analyze and/or infer characteristics of the advertisement that may have an influence on the pattern and resulting billing level. For example, the intelligence component 310 may attribute the pattern and billing level to funny content piece or jaw dropping stunt during seconds 12-20 of the advertisement. System 300 can further facilitate selling such business intelligence information gathered in response to analysis of user interest and interaction with advertisement to producers of advertisements.

Figure 4:
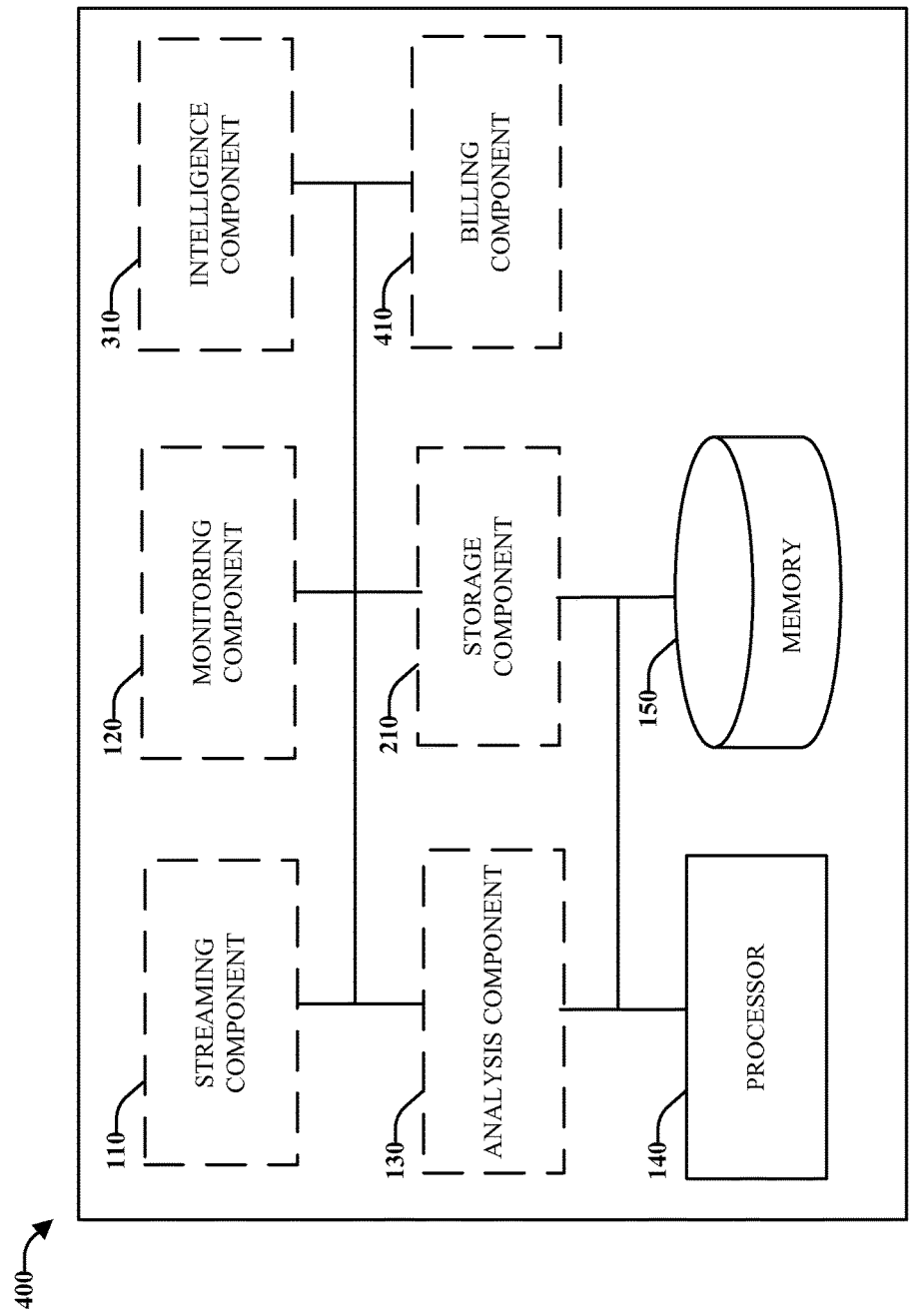
FIG. 4 illustrates an example of another non-limiting system that facilitates providing media advertisements and billing for the providing of the advertisements based on user interaction with the advertisements in accordance with various aspects and implementations described herein.

With reference to FIG. 4, presented is another exemplary non-limiting embodiment of a media system 400 that facilitates providing media advertisements and billing for the providing of the advertisements based on user interaction with the advertisements. System 400 can include a billing component 410 that generates a bill when the analysis component or intelligence component determines a billable event occurs with respect to providing of an advertisement. As used herein, a billable event refers to a determination by the analysis component 130 or intelligence component 310 of a billing level for a provided advertisement representative of a monetary amount greater than a predetermined threshold. For exemplary purposes, a billable event will be referred to generally herein as a determination of a billing level with a monetary amount greater than zero.

For example, each time the analysis component 130 or intelligence component 310 determines a billable event associated with an advertisement, the billing component 410 can generate a bill associated with the advertisement. According to this example, a user may be provided with an advertisement and interact with the advertisement in a manner that results in a billing level of 3 according to the analysis component 130. The billing component 410 is configured to determine a monetary amount associated with a billing level of 3 for the particular advertisement. In an aspect, the analysis component 130 or intelligence component 310 may provide the monetary amount or the billing component 410 may look up the monetary amount in a look-up table provided in memory 150. If the monetary amount is above a predetermined threshold such as zero for example, the billing component 410 can generate a bill with the monetary amount for the billing level 3. For example, media system 400 may charge an advertisement owner or sponsor $1 for a billable event at a billing level of 3. In an aspect, in response to generating a bill, the billing component can send the bill to a designated payee for the bill. For example, the billing component 410 can send an electronic or paper invoice to the owner or sponsor of the advertisement. In another aspect, the billing component 410 may accumulate charges for an advertisement from a billable event over a period of time and generate a bill or invoice over predetermined increments of time. For example, the billing component 410 may generate a bill once a week, once every two weeks, once a month, and etc.

Figure 5:
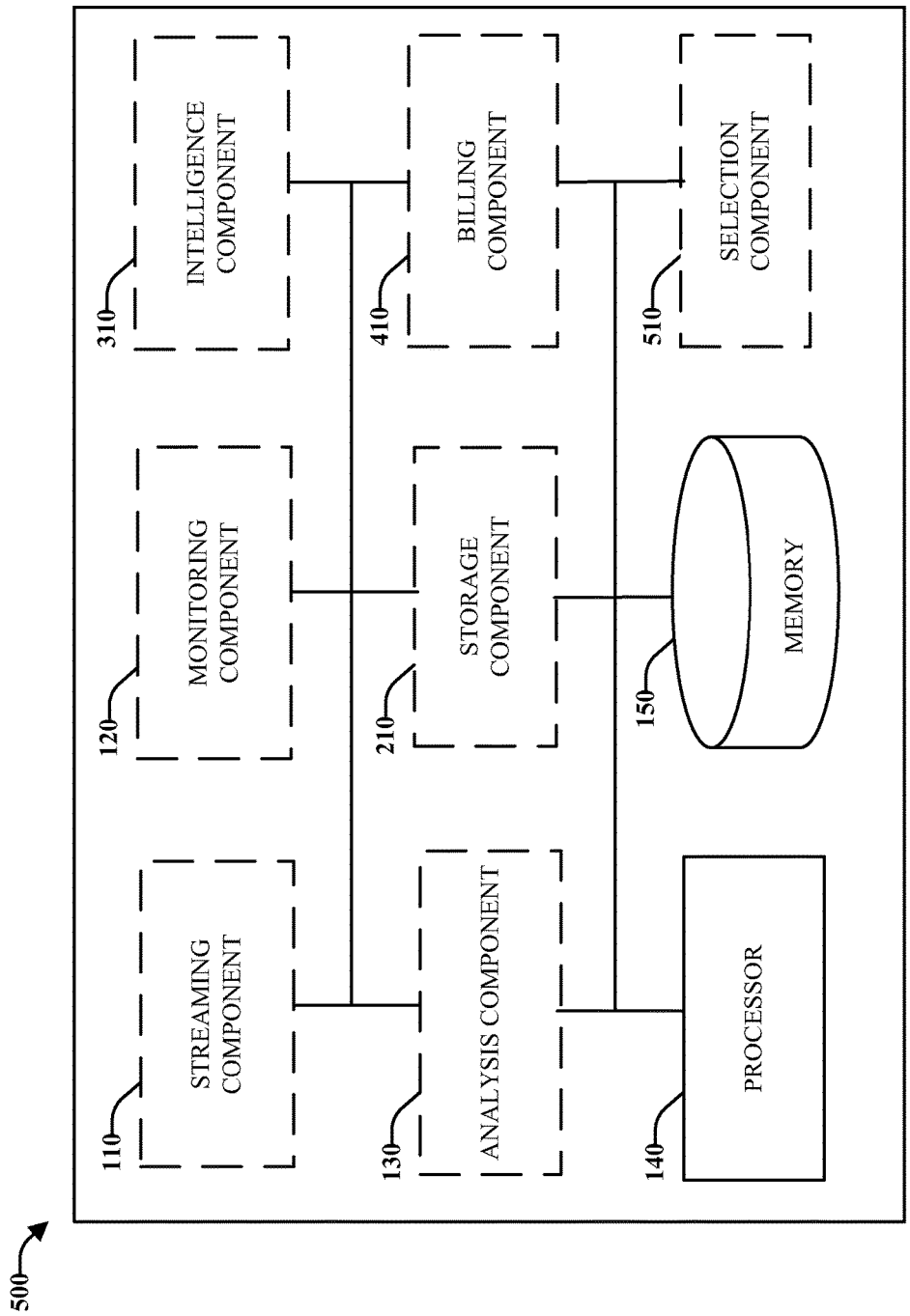
FIG. 5 illustrates an example of a non-limiting system that facilitates providing an in-stream media advertisement and selecting between the advertisement and another media item provided with the media advertisement based on user engagement with the advertisement in accordance with various aspects and implementations described herein.

With reference to FIG. 5, presented is another exemplary non-limiting embodiment of a media system 500 that facilitates providing an in-stream media advertisement and selecting between the advertisement and another media item provided with the media advertisement based on user engagement with the advertisement. System 500 can include a selection component 510. Selection component 510 is configured to select between playing an advertisement and another media item based at least on user interaction and/or interest/engagement with the advertisement.

In an embodiment, streaming component 110 streams a media item in association with an advertisement. For example, a user may request to view a media item such as a movie, provided by media system 500 and at the initiation of the movie, the user may first be presented with an in-stream media advertisement. Media system 500 can gain a measure of a user's interest/engagement in the video in the manners disclosed herein. Selection component 510 is configured to select between playing the advertisement or a media item related to the advertisement and the original requested media item based on the determined or inferred user interest/engagement level. For instance, a user may be determined more interested in the advertisement than the original requested media item. In response, the selection component 510 may replace the playing of the requested media item with a continued version of the advertisement or a media item related to the advertisement. For example, a user may select to view a first movie. Prior to the initiation of a first movie, the user may be presented with an advertisement for a second movie. The intelligence component 310 may determine that the user is greatly interested in the second movie and rather than playing the originally requested movie, the selection component 510 can replace the first movie with the second movie.

In an aspect, the selection component 510 can automatically replace a requested media item with the advertisement associated therewith in response to user engagement level with the advertisement being above a predetermined threshold. In an aspect, the selection component 510 can further employ user profile or preference information directing replacement parameters of advertisements for originally requested content. For example, in addition to determining or inferring user interest in an advertisement, the intelligence component 310 may determine or infer a user's interest in another media item, such as the requested media item. In turn, the intelligence component 310 may further determine which of the advertisement or the requested media item that the user is more interested in. Still in yet another aspect, the selection component can provide a user with an option to replace a requested media item with an associated in-stream advertisement in response to user engagement level being above a predetermined threshold. According to this aspect, the selection component 510 can provide a pop up dialogue box offering the user the option to select between playing the advertisement and another media item.

Figure 6:
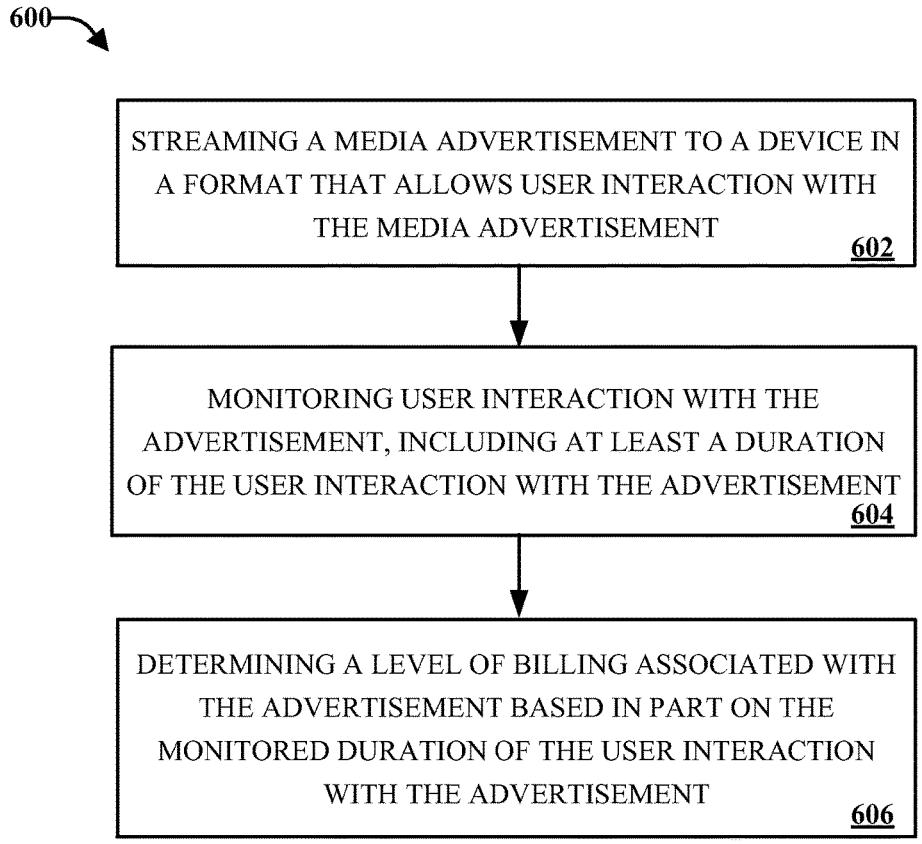
FIG. 6 illustrates an example methodology for providing media advertisements and billing for the providing of the advertisements based on user interaction with the advertisements in accordance with various aspects and implementations described herein.
Figure 7:
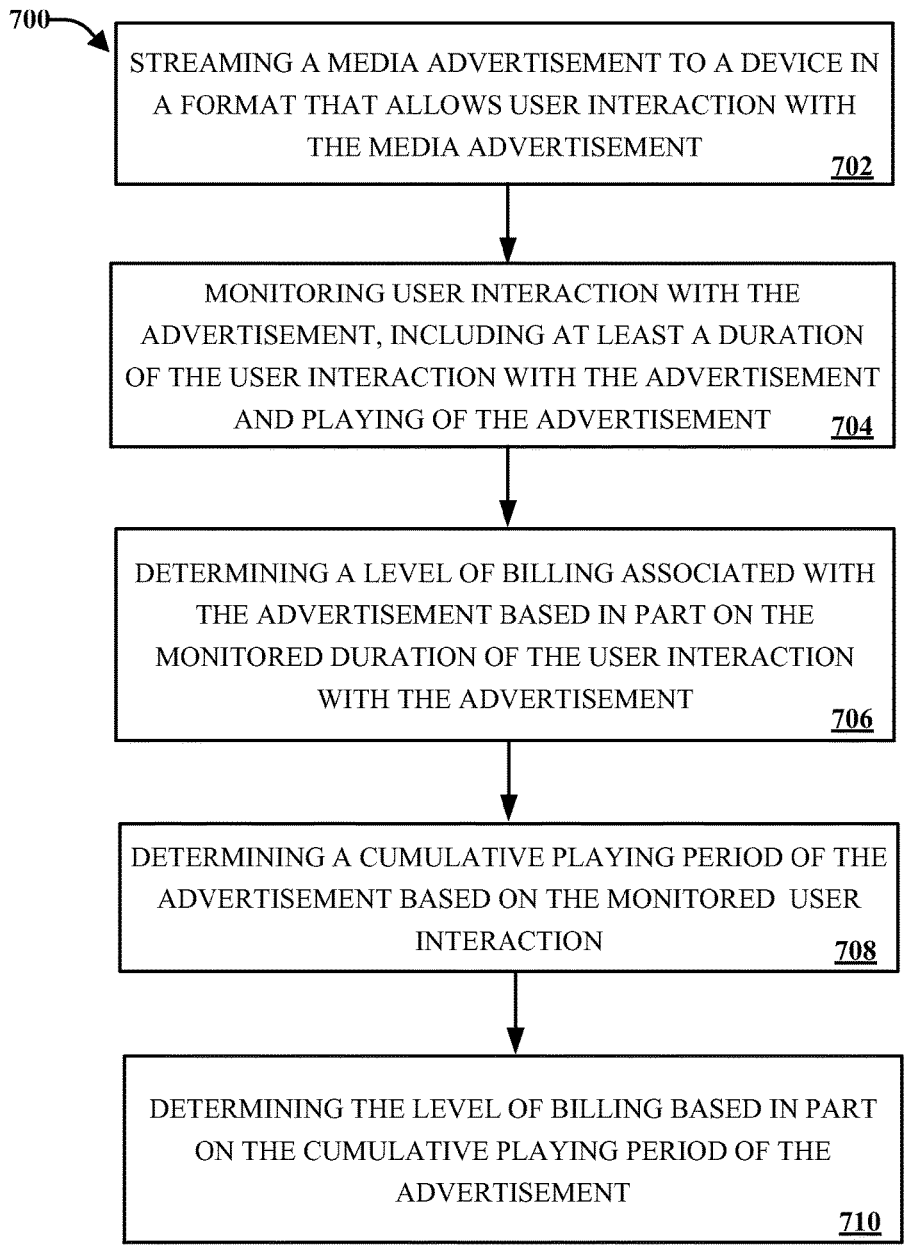
FIG. 7 illustrates another example methodology for providing media advertisements and billing for the providing of the advertisements based on user interaction with the advertisements in accordance with various aspects and implementations described herein.
Figure 8:
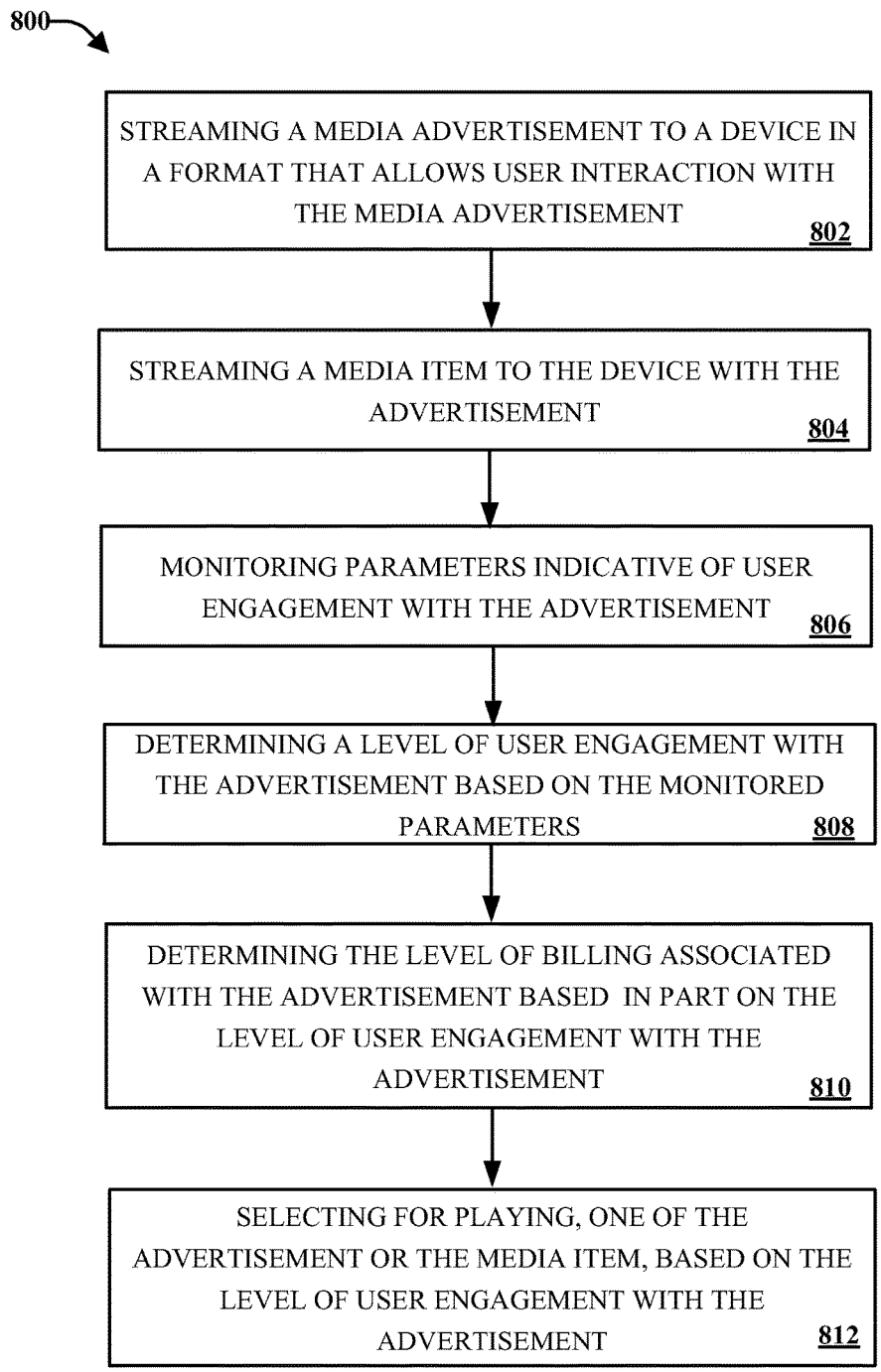
FIG. 8 illustrates an example methodology for providing an in-stream media advertisement and selecting between the advertisement and another media item provided with the media advertisement based on user engagement with the advertisement in accordance with various aspects and implementations described herein.

FIGS. 6-8 illustrates methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, presented is a flow diagram of an example application of systems disclosed in this description accordance with an embodiment. In an aspect, exemplary methodology 600, a media system is stored in a memory and utilizes a processor to execute computer executable instructions to perform functions. At 602 a media advertisement is streamed to a device in a format that allows user interaction with the media advertisement (e.g. using streaming component 110). At 604, duration of user interaction with the advertisement is monitored (e.g. using monitoring component 120). Then at 606, a level of billing associated with the advertisement is determined based in part on the monitored duration of user interaction with the advertisement (e.g. using analysis component 130).

Referring now to FIG. 7, presented is another flow diagram of an example application of systems disclosed in this description accordance with an embodiment. In an aspect, exemplary methodology 700, a media system is stored in a memory and utilizes a processor to execute computer executable instructions to perform functions. At 702, a media advertisement is streamed to a device in a format that allows user interaction with the media advertisement (e.g. using streaming component 110). At 704, duration of user interaction with the advertisement is monitored (e.g. using monitoring component 120). At 706, level of billing associated with the advertisement is determined based in part on the monitored duration of user interaction with the advertisement (e.g. using analysis component 130). At 708, a cumulative playing period of the advertisement is determined based on the monitored duration of user interaction (e.g. using analysis component 130). Then at 710, the level of billing is determined based in part on the cumulative playing period of the advertisement. (e.g. using analysis component 130).

Referring now to FIG. 8, presented is a flow diagram of an example application of systems disclosed in this description accordance with an embodiment. In an aspect, exemplary methodology 800, a media system is stored in a memory and utilizes a processor to execute computer executable instructions to perform functions. At 802 a media advertisement is streamed to a device in a format that allows user interaction with the media advertisement (e.g. using streaming component 110). At 804, a media item is also streamed to the device with the advertisement. At 806, parameters indicative of user engagement with the advertisement are monitored (e.g. using monitoring component 120). At 808, a level of user engagement with the advertisement is determined based on the monitored parameters. (e.g. using analysis component 130 and/or inference component 310). At 810, a level of billing associated with the advertisement is determined based in part on the level of user engagement with the advertisement (e.g. using analysis component 130). At 812, one of the advertisement or the media item is selected for playing based on the level of user engagement with the advertisement (e.g. using selection component 130).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
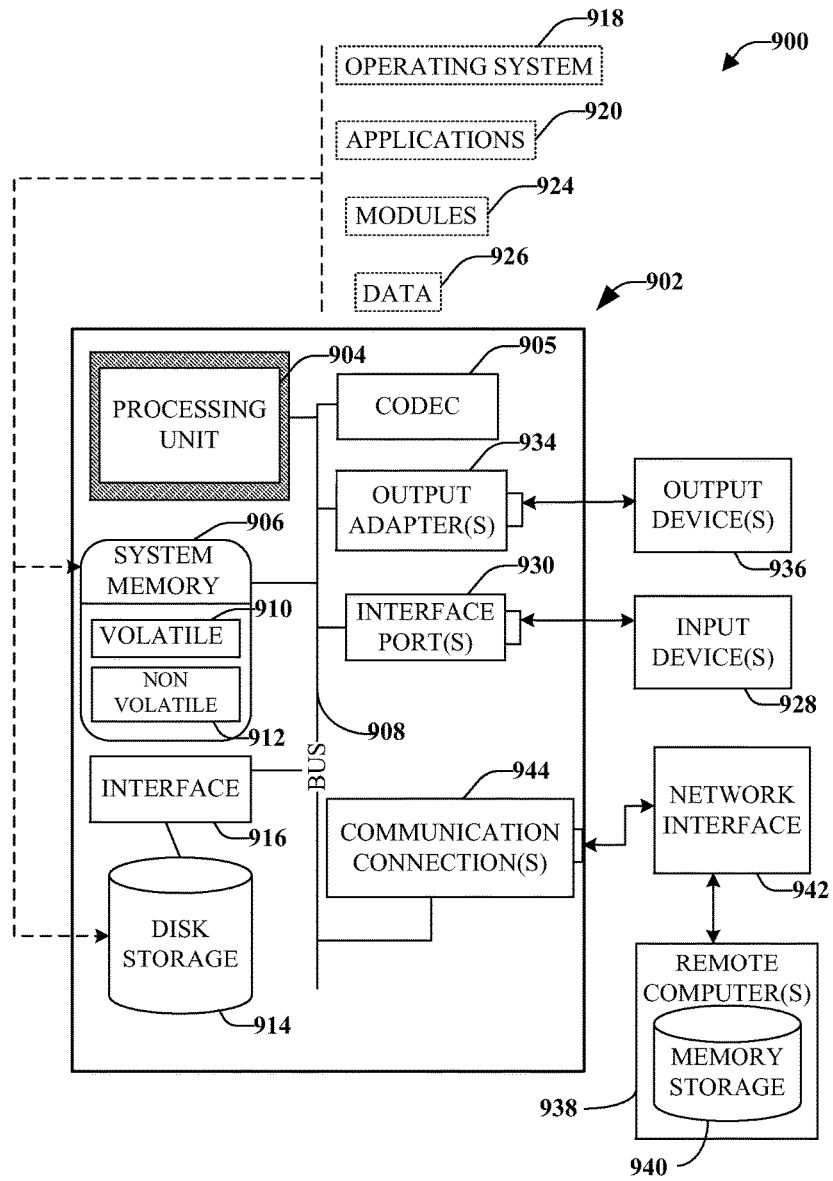
FIG. 9 is a block diagram representing an exemplary non-limiting networked environment in which various embodiments can be implemented in accordance with various aspects and implementations described herein.

With reference to FIG. 9, a suitable environment 900 for implementing various aspects of the claimed subject matter includes a computer 902. The computer 902 includes a processing unit 904, a system memory 906, a codec 905, and a system bus 908. It is to be appreciated that the computer 902 can be used to implement one or more of the systems or components described and shown in connection with FIGS. 1-5. In an aspect, processing unit 904 and system memory 906 can represent processor 140 and memory 150 respectively. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 718 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
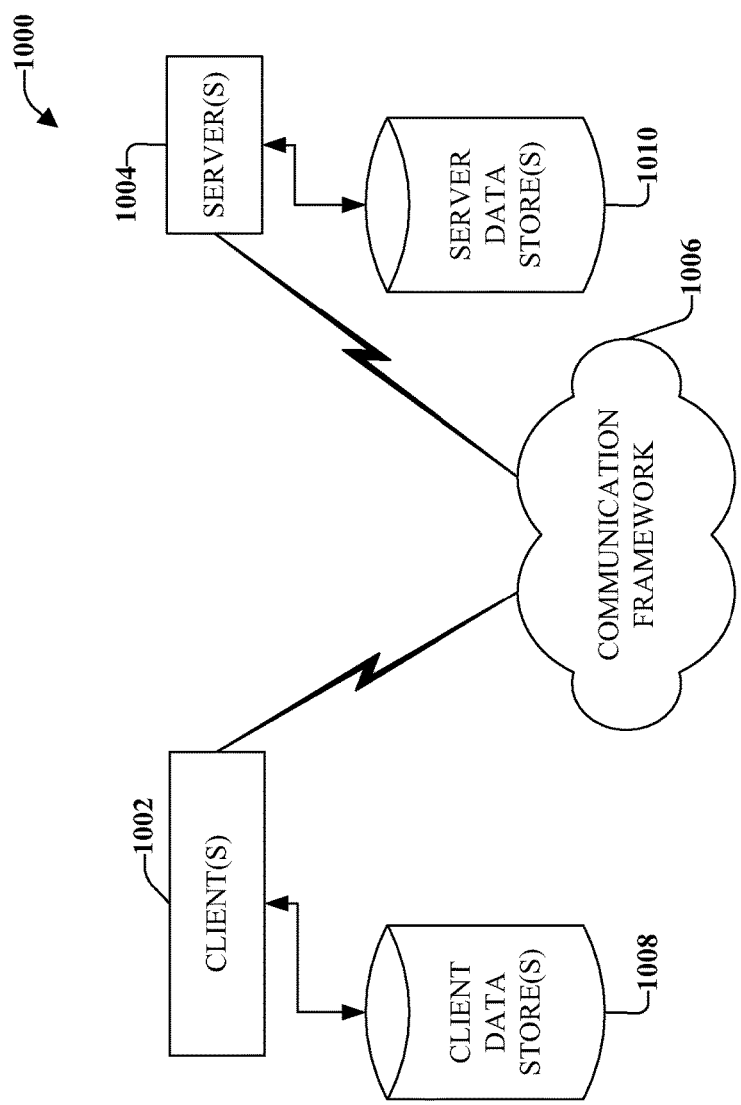
FIG. 10 is a block diagram representing an exemplary non-limiting computing system or operating environment in which various embodiments may be implemented in accordance with various aspects and implementations described herein.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). System 1000 can for example be employed in connection with implementing one or more of the systems or component described herein show in FIGS. 1-5. The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
a memory; and
a processor, coupled to the memory, to:
receive, from a device, a request for a first media item;
automatically select a second media item based at least on the request for the first media item;
automatically stream the second media item to the device in a format that allows user interaction with the second media item;
determine an interaction level with the second media item at the device, wherein the interaction level is based at least on whether a player application window in which the second media item is played is obscured by another open window and to what degree;
identify an input attribute vector;
employ a classification analysis to map the input attribute vector to a confidence level that the input attribute vector corresponds to the interaction level;
based on a determination that the interaction level is above a predetermined threshold:
replace the second media item with a third media item that is associated with the second media item, and stream the third media item to the device in response to the request for the first media item;
determine a level of billing associated with the second media item based at least in part on a cumulative duration of the user interaction with the second media item, specific portions of the second media item viewed, a type of interaction with the second media item, a frequency of interaction with the second media item, or a timing of interaction with the second media item; and
generate a bill based on the level of billing determined by the processor for the second media item, the level of billing corresponding to at least one of the determined level of user interaction or the determined engagement level.

2. The system of claim 1, wherein the processor is to determine a cumulative playing period of the second media item based on the determined user interaction level.

3. The system of claim 1, wherein the processor is to determine a duration of time when at least portions of the second media item are played, wherein portions of the second media item can be played in nonconsecutive order.

4. The system of claim 1, wherein the processor is to determine a duration of time when at least portions of the second media item are played, including a duration of time associated with replaying portions of the second media item.

5. The system of claim 1, wherein the processor is to determine fast-forwarding of the second media item.

6. The system of claim 1, wherein the processor is to determine rewinding of the second media item.

7. The system of claim 1, wherein the processor is to stream the second media item in a format that enables at least one of playing the second media item in real-time, re-playing the second media item, pausing the second media item, fast-forwarding the second media item, or rewinding the second media item.

8. The system of claim 1, wherein the processor is to store determined information indicating user interaction with the second media item.

9. The system of claim 8, wherein the processor is to identify a pattern in the determined information and determine a characteristic of the second media item for which the pattern is based.

10. The system of claim 1, wherein the processor is to:
    determine parameters indicative of the interaction level;
    determine the interaction level based on the determined parameters.

11. The system of claim 10, wherein the processor is to:
    stream the first media item to the device with the second media item; and
    select for playing, one of the second media item or the first media item, based on the interaction level.

12. The system of claim 10, wherein the parameters indicative of the interaction level include at least one of type of user interaction, timing of user interaction, or frequency of user interaction.

13. A method comprising:
    receiving, from a device, a request for a first media item;
    automatically selecting a second media item based at least on the request for the first media item;
    automatically streaming, by a processing device, the second media item to the device in a format that allows user interaction with the second media item;
    determining, by the processing device, an interaction level with the second media item at the device, wherein the interaction level is based at least on whether a player application window in which the second media item is played is obscured by another open window and to what degree;
    identifying, by the processing device, an input attribute vector;
    employ, by the processing device, a classification analysis to map the input attribute vector to a confidence level that the input attribute vector corresponds to the interaction level; based on a determination that the interaction level is above a predetermined threshold:
        replacing the second media item with a third media item that is associated with the second media item, and
        streaming the third media item to the device in response to the request for the first media item;
    determining a level of billing associated with the second media item based at least in part on a cumulative duration of the user interaction with the second media item, specific portions of the second media item viewed, a type of interaction with the second media item, a frequency of interaction with the second media item, or a timing of interaction with the second media item; and
    generating a bill based on the level of billing determined by the processor for the second media item, the level of billing corresponding to at least one of the determined level of user interaction or the determined engagement level.

14. The method of claim 13, further comprising: determining a cumulative playing period of the second media item based on the determined interaction level.

15. The method of claim 13, wherein the determining the interaction level comprises determining a duration of time at least portions of the second media item are played, wherein portions of the second media item can be played in a nonconsecutive order.

16. The method of claim 13, wherein the determining the interaction level comprises determining a duration of time at least a portion of the second media item is played, including determining replaying of the portion.

17. The method of claim 13, wherein the determining the interaction level comprises determining fast-forwarding of the second media item.

18. The method of claim 13, wherein the determining the interaction level comprises determining rewinding of the second media item.

19. The method of claim 13, wherein the streaming the second media item comprises streaming the second media item in a format that enables at least one of playing the second media item in real-time, re-playing the second media item, pausing the second media item, fast-forwarding the second media item, or rewinding the second media item.

* * * * *